P. SINSZ.

Mounting Glazier's Diamonds.

No. 8,478. Reissued Nov. 5, 1878.

Witnesses:
Charles E. Lewis.
A. C. Eader

Inventor:
Philip Sinsz
By his Atty
Chas B. Mann

N. PETERS, PHOTO-LITHOGRAPHER, WASHINGTON, D. C.

UNITED STATES PATENT OFFICE.

PHILIP SINSZ, OF BALTIMORE, MARYLAND.

IMPROVEMENT IN MOUNTING GLAZIERS' DIAMONDS.

Specification forming part of Letters Patent No. 64,157, dated April 23, 1867; Reissue No. 8,478, dated November 5, 1878; application filed October 23, 1878.

*To all whom it may concern:*

Be it known that I, PHILIP SINSZ, of the city of Baltimore, in the State of Maryland, have invented a new and useful Improvement in Mounting Glaziers' Diamonds; and I do hereby declare the following to be a full, clear, and exact description of the nature, construction, and operation of the same, reference being had to the accompanying drawings, in which—

Figure 1:
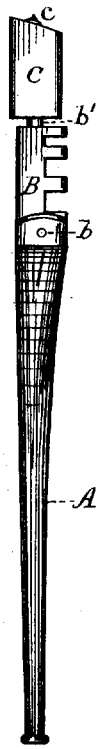
Figure 2:
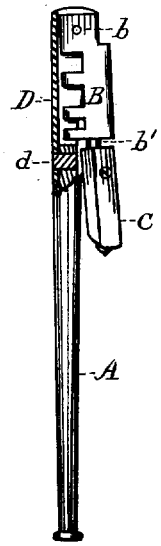
Figure 3:
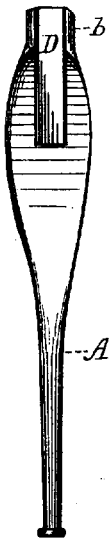
Figure 4:
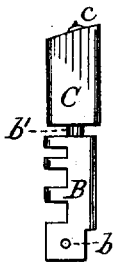

Figure 1 is a side view of my improved instrument as it appears when ready for use. Fig. 2 is a side view, showing the same in its closed condition, a portion being broken away, showing part in section. Fig. 3 is a transverse side view of handle. Fig. 4 is a view of the diamond-block and breaker detached from handle.

This invention relates to the instrument commonly called the "glazier's diamond," which is provided, in addition to the diamond for cutting the glass, with a notched plate or bar for breaking it off after being cut.

Heretofore in instruments of this class the breaker has been pivoted to and adapted to close upon one end of a handle while upon the opposite end of the same handle the diamond-block is similarly attached; but such construction necessitates a change in shape from the most approved form of handle, and cannot be so conveniently held between the fingers when in use.

In another form of these instruments the breaker is attached in a recess on the side of a ferrule, to which the handle is rigidly secured, while at the other end of the ferrule the diamond-block is swiveled. This construction projects the notches of the breaker beyond the line between the handle and diamond-block, and renders it inconvenient to carry in the pocket. My invention overcomes these several disadvantages; and consists in swiveling the diamond-block directly to one end of the notched breakers, dispensing with the common recessed ferrule; and further consists in pivoting the other end of the breaker, having the diamond-block swiveled directly to it, to the handle of usual form, so that the breaker and diamond-block may be closed upon one end of the handle simultaneously. By this construction, when the instrument is ready for use, the notched breaker is brought into line with the axis of the handle and diamond-holder, and the notches do not project beyond the same, so that it can be carried in the pocket without inconvenience whether closed or extended ready for use.

In the accompanying drawings, A represents the handle of the instrument, which is of the usual form. B is the breaker, which consists of a bar or plate having a series of notches of different size adapted to embrace glass of different thickness. This breaker is attached to the handle by a pivot or joint at *b*. C is the block or holder in which the diamond *c* is set, and is attached directly to the end of the breaker B by a swivel-joint, *b'*, so that, when the diamond is drawn over the glass in the operation of cutting, the block C will adjust itself against the edge of the ruler employed to guide the diamond.

D is a spring, which is secured to the handle A by a screw, *d*, and which, by bearing against the back or front of the breaker near the end, serves to give rigidity to the breaker and diamond-block either in their open or closed position. Thus it will be seen the breaker and diamond-block can be simultaneously closed upon one end of the handle.

Having described my invention, the following is what I claim and desire to secure by Letters Patent:

1. The within-described glazier's diamond, the same having the breaker B jointed or pivoted to the handle A and the diamond-block swiveled to the breaker, substantially as and for the purpose set forth.

2. A glazier's diamond-holder, in which the diamond-block is swiveled directly to the end of the notched breaker, as set forth.

3. A glazier's diamond-holder in which the diamond block is swiveled directly to the end of the notched breaker, while the other end of the breaker is attached to the handle, the relation of the parts being such that the notches do not project beyond the line between the handle and diamond-block, as set forth.

PHILIP SINSZ.

Witnesses:
CHARLES E. LEWIS,
CHAS. B. MANN.